United States Patent [19]

Patel et al.

[11] Patent Number: 5,621,045
[45] Date of Patent: Apr. 15, 1997

[54] THERMOPLASTIC VULCANIZATES FROM ISOBUTYLENE RUBBER AND EITHER EPDM OR A CONJUGATED DIENE RUBBER

[76] Inventors: Raman Patel, 578 Sun Valley Dr.; Sabet Abdou-Sabet, 3568 Knollwood La., both of Akron, Ohio 44313

[21] Appl. No.: 556,673

[22] Filed: Nov. 13, 1995

[51] Int. Cl.[6] .............................. C08L 15/02; C08L 23/16
[52] U.S. Cl. ..................... 525/237; 525/240; 525/194; 525/232
[58] Field of Search ................................. 525/237, 240, 525/194, 232

[56] References Cited

U.S. PATENT DOCUMENTS

| | | | |
|---|---|---|---|
| 4,104,210 | 8/1978 | Coran et al. | 525/232 |
| 4,130,534 | 12/1978 | Coran et al. | 514/327 |
| 4,202,801 | 5/1980 | Peterson | 525/232 |
| 4,299,931 | 11/1981 | Coran et al. | 525/95 |
| 4,311,628 | 1/1982 | Abdou-Sabet et al. | 524/447 |
| 4,340,684 | 7/1982 | Bohm et al. | 525/194 |
| 4,593,062 | 6/1986 | Puydak et al. | 524/426 |
| 4,801,651 | 1/1989 | Komatsu et al. | 525/195 |
| 4,851,468 | 7/1989 | Hazelton et al. | 525/519 |
| 4,871,796 | 10/1989 | Komatsu et al. | 524/474 |
| 4,873,288 | 10/1989 | Komatsu et al. | 525/194 |
| 4,912,148 | 3/1990 | Kim et al. | 524/487 |
| 4,916,180 | 4/1990 | Robinson et al. | 524/456 |
| 5,051,477 | 9/1991 | Yu | 525/194 |
| 5,073,597 | 12/1991 | Puydak et al. | 525/193 |
| 5,081,179 | 1/1992 | Sezaki et al. | 524/526 |
| 5,100,947 | 3/1992 | Puydak et al. | 524/423 |
| 5,157,081 | 10/1992 | Puydak et al. | 525/237 |
| 5,162,445 | 11/1992 | Powers et al. | 525/333.4 |

FOREIGN PATENT DOCUMENTS

0344221A2  11/1990  European Pat. Off. .

*Primary Examiner*—Irina S. Zemel
*Attorney, Agent, or Firm*—Samuel B. Laferty; William A. Skinner

[57] ABSTRACT

Thermoplastic vulcanizates from semicrystalline polyolefins and blends of crosslinked rubbers are disclosed. The blends are a mixture of at least two rubbers. One rubber is a copolymer predominantly of $C_4$ to $C_7$ isomonoolefins (e.g. isobutylene), along with optional monomers of conjugated dienes and/or p-alkylstyrene. This copolymer is optionally halogenated. The second rubber is ethylene/propylene rubber, natural rubber or a rubber polymerized predominantly from a conjugated diene. Such rubbers include polybutadiene, nitrile rubber, butadiene-styrene copolymers or combinations thereof.

13 Claims, No Drawings

THERMOPLASTIC VULCANIZATES FROM ISOBUTYLENE RUBBER AND EITHER EPDM OR A CONJUGATED DIENE RUBBER

FIELD OF THE INVENTION

The invention relates to thermoplastic vulcanizates desirably having been prepared by dynamic vulcanization. The thermoplastic vulcanizates comprises a semicrystalline polyolefin plastic matrix, such as polypropylene and at least two crosslinked rubbers wherein one rubber is a rubbery copolymer of isobutylene and another is at least one other rubbery polymer, such as ethylene/propylene rubber (EPDM), polyisoprene, polybutadiene, butadiene-styrene rubber, nitrile rubber, or combinations thereof.

BACKGROUND

Thermoplastic vulcanizates made by dynamic vulcanization techniques predominantly use a semicrystalline polyolefin continuous phase and a dispersed rubber phase consisting of a copolymer of isobutylene or ethylene/propylene diene (EPDM) polymer. The copolymer from isobutylene or EPDM is highly preferred among rubbers in general because of their ability to retain their properties after high temperature processing and aging. They are not blended with rubbers from conjugated dienes having substantial amounts of residual unsaturation. Copolymers of isobutylene have different cure rates than rubbers with substantial amounts of residual unsaturation. Further, copolymers of isobutylene are not completely miscible with these other rubbers.

SUMMARY OF THE INVENTION

Disclosed are thermoplastic vulcanizates having a semicrystalline phase and a rubber phase. The rubber phase is comprised of at least two rubbers. One rubber is an isobutylene copolymer used in amounts from about 30 to about 90 weight percent of the total rubbers. The second rubber is either 1) a polymer or copolymer of one or more conjugated diene and other optional monomers and/or 2) an ethylene/propylene rubber. The blend of the two or more rubbers is desirable to retain specific properties after aging at 125° or 150° C. such as ultimate tensile strength (UTS) and/or good ultimate elongation (UE).

DETAILED DESCRIPTION

This invention relates to thermoplastic vulcanizates (TPV). They are comprised of a semicrystalline plastic phase and a rubber phase. The rubber phase is comprised of at least two rubbers. One rubber is a copolymer of a $C_4$–$C_7$ isomonoolefin (e.g. isobutylene) and one or more copolymerizable monomers, while another rubber is either 1) a copolymer of one or more conjugated diene and other optional monomers and/or 2) an ethylene/-propylene rubber. Additives such as extender oils, lubricants, stabilizers, fillers, etc. may also be included.

In a preferred method of preparation, the rubbers (elastomers) and semicrystalline polymer are melt blended above the melt temperature of the semicrystalline polymer, then the rubbers are vulcanized with a crosslinking agent(s) under dynamic conditions. This is called dynamic vulcanization. The product of the dynamic vulcanization is called a thermoplastic vulcanizate (TPV). Thermoplastic vulcanizates are a subset of thermoplastic elastomers.

During dynamic vulcanization, the semicrystalline polyolefin is generally unaffected by the crosslinking agent(s) while the rubber phase is crosslinked and dispersed in the thermoplastic matrix. Mixing at high shear rates is used during the vulcanization to achieve the desired level of dispersion of the rubber phase. This level of dispersion is often characterized by an average or range of domain sizes of the dispersed phase. Desirably the dispersed phase (e.g. rubber) has a number average diameter of less than 50 µm and more desirably less than 20 µm. After dynamic vulcanization, the thermoplastic vulcanizate is removed from the mixing equipment, cooled and prepared for subsequent use. After dynamic vulcanization, the TPV is often pelletized to facilitate handling. Desirably, the residual amount of crosslinking agent in the TPV is very small or the residual crosslinking agent is deactivated before it is further processed. The fillers and the additives may be added before, during or after dynamic vulcanization. Desirably the fillers are predominantly (e.g at least 50, at least 60, at least 70 or at least 80 weight percent) in the rubber phase of the thermoplastic vulcanizate rather than in the plastic phase. Vulcanization is used herein to refer to crosslinking with sulfur and/or other appropriate crosslinking systems such as disclosed in U.S. Pat. No. 4,130,534 hereby fully incorporated by reference.

The term semicrystalline polyolefin is used to refer to polyolefins that are usually from about 10 and about 98 weight percent crystalline at room temperature. The preferred semicrystalline polyolefin include polypropylene, polyethylene, (such as low density (LDPE), high density, linear low density (LLDPE), etc.) polybutylene (PB), as well as semicrystalline copolymers of ethylene with vinyl acetate, acrylic acid, methyl acrylate, or ethyl acrylate, etc. Preferred are HDPE and polypropylene. As used herein, the term "polypropylene" includes homopolymers of propylene as well as reactor copolymers of polypropylene (PPRC) which can contain from about 1 to about 20 weight percent ethylene or an alpha olefin comonomer of 4 to 16 carbon atoms. The term polybutylene refers to a semicrystalline polymer while the term isobutylene copolymers refers to a rubber. The term "copolymer" as used herein means a polymer from two or more monomers.

The semicrystalline polyolefin can be from about 10 to about 90 parts by weight per one hundred parts by weight of the total of the semicrystalline polyolefin and the at least two rubbers of the disclosure. More desirably the semicrystalline polyolefin is from about 25 to about 75 parts by weight per one hundred parts by weight of the total. The at least two rubbers are from about 10 to about 90 parts by weight. More desirably they are from about 25 to about 75 parts by weight based on one hundred parts by weight of the total of the semicrystalline polyolefin and the at least two rubbers.

Rubbers are polymers with glass transition temperatures below 20° C. (rubbery at room temperature), more desirably below 0° C. and preferably below −20° C., that exhibit properties such as the ability to undergo recoverable elongation to 100 percent, 200 percent, or 300 percent when crosslinked. Rubbers may have small amounts of crystallinity (i.e., less than 10 percent) and still exhibit this behavior. They differ from semicrystalline polyolefins in that semicrystalline polyolefins desirably have from about 10 to about 98 weight percent crystallinity as measured by their solubility in an appropriate solvent. Desirably, these rubbers will have weight average molecular weights before crosslinking of at least 25,000 or 50,000 and desirably from about 100,000 to about 1,000,000.

The rubber copolymer derived from $C_4$ to $C_7$ isomonoolefins is desirably from 30 to 90 weight percent, more desirably from 40 to 70 weight percent of the total rubbers in the composition. It may be one or more rubbers selected from copolymers of $C_4$ to $C_7$ isomonoolefins. Examples of the copolymer of $C_4$ to $C_7$ monoisoolefins are butyl rubber, halogenated butyl rubber, a copolymer of a $C_4$ to $C_7$ isomonoolefin and an alkylstyrene, having from 7 to 12 carbon atoms, and a halogenated copolymer of a $C_4$ to $C_7$ isomonoolefin and an alkylstyrene. The preferred alkylstyrene desirably present from about 0.5 to about 20 weight percent is para-methylstyrene with the residual being from about 80 to about 99.5 weight percent $C_4$ to $C_7$ isomonoolefin (preferably isobutylene). The para-methyl group is easily halogenated and therefore halogenated copolymers of para-methyl styrene have most of their halogen on the methyl groups. The, halogen of preference is bromine. The bromine content of halogenated copolymers from para-methylstyrene is desirably from 0.1 to 3 weight percent. U.S. Pat. No. 5,162,445 hereby fully incorporated by reference describes copolymers of $C_4$ to $C_7$ isomonoolefins with alkylstyrenes and their method of preparation.

The term butyl rubber refers to copolymers of at least isobutylene and one or more conjugated diene wherein the isobutylene is from about 85 to about 99.9 weight percent of the copolymer, more desirably from about 95 to about 99.5 weight percent, and the one or more conjugated dienes have from 4 to 14 or 4 to 10 carbon atoms and are present from about 0.1 or 0.5 to about 15 weight percent, more desirably from 0.5 to 5 weight percent. Less preferred copolymers can substitute-partly or completely other $C_4$ to $C_7$ isomonoolefins for isobutylene using the weight percents recited above. The butyl rubber may be noncrosslinked or partially crosslinked before use. These butyl rubber copolymers are commercially available and may contain divinylbenzene. These copolymers may include trace impurities due to impurities in the monomers used or impurities in the polymerization reactants or derived from the polymerization reactants (initiator fragments). These copolymers may be halogenated to modify their curing characteristics. Bromine and chlorine are preferred halogens.

The remaining rubber is EPDM, natural rubber or rubber polymerized from one or more conjugated diene or combinations thereof in the thermoplastic vulcanizate rubber from conjugated dienes desirably are from about 10 to about 70 weight percent, more desirably from about 30 to about 60 weight percent of the total rubbers. It may be a single rubber or a mixture of rubbers. If the rubber is polymerized from one or more conjugated dienes then desirably at least 50 weight percent and more desirably 60 weight percent of the monomers polymerized into the rubber are polymerized from one or more conjugated dienes having from 4 to 8 carbon atoms. The conjugated dienes are generally nonhalogenated and desirably exclude chloroprene or blends of nonhalogenated dienes with chloroprene. Desirably, co-monomers either as an individual monomer or as a mixture can be up to 50 weight percent of the repeat units of the rubbers and more desirably up to 40 weight percent. Examples of preferred comonomers which can be present as repeat units are vinyl aromatic monomers having from 8 to 12 carbon atoms, unsaturated nitrile monomers having from 3 to 6 carbon atoms, and acrylates or alkyl acrylates having from 4 to 18 carbon atoms. Other comonomers such as unsaturated mono or dicarboxylic acid monomers can be present up to 10 or 20 weight percent in the elastomer derived predominantly from conjugated dienes.

Desirably, these rubbers are natural rubbers; polybutadiene; styrene butadiene rubber (with from 50 to 90 or more weight percent repeat units from butadiene), polyisoprene (synthetic polyisoprene irrespective of microstructure); and nitrile rubber (desirably from about 50 or 60 to 80 weight percent conjugated diene (preferably butadiene); and from about 20 to about 40 or 50 weight percent acrylonitrile). The preparation of such polymers are well known to the art. Often small amounts of polar monomers such as unsaturated mono or dicarboxylic acids or divinyl compounds may be copolymerized into these polymers. Ethylene/propylene rubber (EPDM) is a copolymer of ethylene, propylene and a nonconjugated diene. The ratio of ethylene to propylene in the copolymer is from about 40/60 to about 85/15 and more desirably from about 50/50 to about 75/25. Nonconjugated dienes for use in EPDM are well known to the art and include 1,4-hexadiene, ethylidene norbornene, dicyclopentadiene, 5-ethylidene-2-norbornene, 1,3-cyclopentadiene, and 5-vinylnorbornene. The amount of the nonconjugated diene in the copolymer is usually up to 10 weight percent, more desirably from about 0.5 to about 4 or 5 weight percent with the remainder being ethylene or propylene. Ethylene/propylene rubber without a nonconjugated diene (EPM) can be crosslinked by radiation curing or peroxide curing. EPDM can be crosslinked with any of the curatives used with unsaturated rubbers. EPDM can be used with the copolymer of $C_4$ to $C_7$ isomonoolefins (preferably isobutylene) and desirably will not be used without a copolymer of a $C_4$ to $C_7$ isomonoolefin. Thus, the thermoplastic vulcanizates of this disclosure will desirably exclude vulcanizates consisting of EPDM with natural rubber or a rubber polymerized from one or more conjugated dienes when a copolymer of $C_4$ to $C_7$ isomonoolefins (e.g. isobutylene) is not included in the amount specified.

Some rubbers such as butadiene-acrylonitrile copolymers (nitrile rubber) have very limited compatibility with copolymers from $C_4$ to $C_7$ isomonoolefins (such as isobutylene). This incompatibility can increase the size of dispersed rubber particles and may inhibit development of optimum properties. One group of compatibilizer molecules which reduce the domain size of the dispersed rubber phase are block or graft copolymers that have one or more blocks (e.g. segments) which are compatible with olefin polymers and one or more blocks that are compatible with nitrile rubber. These compatibilizers are disclosed in detail in U.S. Pat. No. 4,299,931 which is hereby incorporated by reference. Compatibilizers as described above are desirably used in amounts from 0.1 to 25 parts by weight per one hundred parts of total rubbers. Examples of blocks compatible with olefins include polybutadiene, polyisoprene, polyalkenamer etc. Examples of blocks compatible with nitrile rubber include epichlorohydrin polymer, polyamide, polyamine, acrylic polymer, polyester, nitrile rubber itself, etc. Preferably only one block of each compatible polymer is present in each block copolymer. Desirably the blocks have molecular weights from about 500 to about 50,000. If the block copolymers are formed by coupling two or more blocks then each block has a functional group capable of reacting with other functional groups to couple said block with another block. It is desirable to have or provide a first type functional group on the nitrile compatible blocks and a second type functional group on the olefin compatible blocks. Desirably the first type functional group is not reactive with itself and reacts with the second type functional group and vice versa.

A suitable functionalized olefin polymer block may be conveniently prepared by masticating block olefin polymer of low or high molecular weight, preferably at a temperature above its melting point for a period of about 1–20 minutes, and 0.1 to 20 weight percent methylol phenolic material in the presence of an activator (catalyst) which promotes reaction between methylol phenolic material and the olefin polymer. The functionalized olefin polymer block can be made from a separate component or from the thermoplastic olefin of the thermoplastic vulcanizate. An example of a satisfactory activator is a Lewis acid. Another suitable functionalized olefin polymer may be prepared by causing an unsaturated carboxylic acid such as acrylic or methacrylic acid, maleic acid or anhydride or ester, or N-substituted maleic acid to react in the presence of free radical generator with olefin polymer by known processes. For example, see U.S. Pat. No. 2,973,344 hereby incorporated by reference. The resulting functionalized olefin polymer is then caused to react with a functional nitrile compatible polymer (e.g. amine functionalized butadiene-acrylonitrile polymer). Examples of these linking processes are shown below.

a) Treat molten mixture of PP (polypropylene) containing a small amount of low M.W. NBR (butadieneacrylonitrile polymer) with a small amount of peroxide.

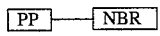

b) First halogenate polypropylene (slightly) then melt mix it with NBR which contains amine groups.

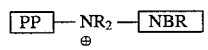

c) First treat molten PP with maleic acid or anhydride (in presence of peroxide), then melt mix it with NBR containing amine groups (which can be introduced into NBR by LiAlH$_4$ reduction). First treat maleic modified PP with polyethylene polyamine (e.g. DETA) then mix it with NBR which contains carboxyl groups.

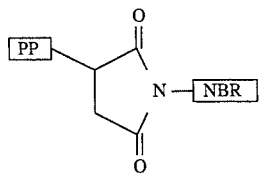

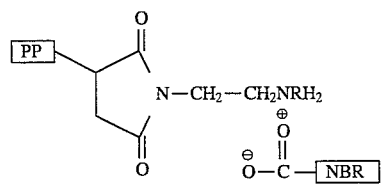

d) First treat molten PP with dimethylol-phenolic derivative (with catalyst) then melt mix it with NBR.

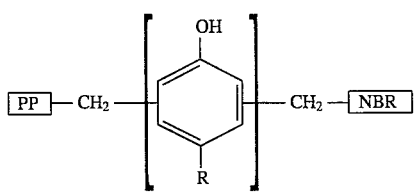

e) First treat molten PP with dimethylol-phenolic derivative (with catalyst) then melt mix it with NBR which contains amine groups.

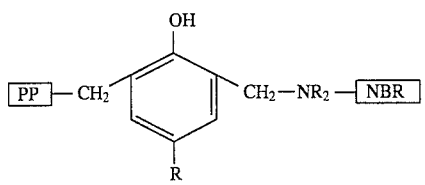

Desirably the thermoplastic vulcanizates of this disclosure have a hardness of about Shore A 40 to about Shore D 60 and more desirably from about Shore A 60 to about Shore D 50.

Fillers can be included in amounts up to about 50 weight percent, more desirably up to about 40 weight percent, and preferably up to 30 weight percent of the thermoplastic vulcanizate (TPV). They may be reinforcing fillers or non-reinforcing fillers. Desirably, at least 20, more desirably at least 50, 60, 70, or at least 80 weight percent of the total fillers are in the elastomeric portion of the TPV. This is desirable in that fillers can enhance the modulus and strength of elastomers. The fillers include particulate fibrous, platelet fillers, etc. They may be organic or inorganic. Specific examples include carbon black, silica, talc, glass fibers, polymer fibers (synthetic or natural), clay and TiO$_2$.

Antioxidants can be included in the TPV. These include physical protectorants and chemicals which minimize oxidation. The chemicals include amines, phenolics, and phosphites. They are used in conventional amounts.

Ultraviolet light stabilizers for the polymers may be included for the TPV. These include hindered amine light stabilizers (HALS).

Processing oils can be included in the TPV. They tend to locate themselves predominantly in the rubbery portion of the TPV so their amount is usually related to the amount of rubber. They can be used in amounts from 0 to 300 parts by weight per 100 parts of rubber (elastomer). Processing oils are usually chosen based on compatibility with the rubber and desirable color and/or aging properties. They may be organic ester plasticizers, paraffinic oils, naphthenic oils, or other aromatic oils.

The TPV can also contain lubricants, antistatic agents, pigments, dyes, flame retardants, processing aids, etc. all well known to polymer processing chemists.

Crosslinking agents are used to crosslink (vulcanize) the rubbers in the TPV. Their preferred amount will be specified based on 100 parts by weight rubber. Applicants use the term phr (parts by weight per one hundred parts by weight rubber) as a standard abbreviation in rubber formulations.

A maleimide crosslinking agent is desirably used if U.V. stabilizers are used in the alloy. Examples of maleimide crosslinking agents are m-phenylene bismaleimide (4,4'-m-phenylene bismaleimide), 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, hexamethylene bismaleimide, and 3,6-durine bismaleimide. Effective amounts include from about 0.5 to about 4 phr. Halobutyl rubbers may be crosslinked with maleimide.

Organic peroxides can be used as crosslinking agents. The amounts to use are well known to the art. Organic peroxides when used to describe crosslinking agents for elastomers include hydroperoxides, perester, benzoyl-peroxycompounds, peroxydicarbonates and sometimes azo compounds such as azobisisobutyronitrile. Ethylenically unsaturated monomers may be used in combination with peroxide or azo compounds in crosslinking elastomers.

Sulfur crosslinking systems for the elastomers can be used. These include sulfur, accelerators for sulfur, and sulfur donor compounds individually or as mixtures.

Zinc oxide may be used alone or in combination with other crosslinking agents for halogenated rubbers such as bromobutyl rubbers.

Resin crosslinking agents can be used. The resins include methylol phenolic resins, brominated phenolic resins, urethane resins etc. When phenolic resin crosslinking agents are used $SnCl_2$ or halogen containing polymers can activate the curing process.

MgO is desirably included in the TPV to provide better retention of physical properties during aging, especially heat aging. Other Lewis Acid scavengers could alternatively be used. Lewis Acid scavengers are particularly advantageous when halogenated polymers are present in the TPV.

The extent of crosslinking of the elastomer can be described by the gel content of the rubber portion (used for low levels of crosslinking) or the molecular weight between crosslinks (used when 90 percent or more of the polymer is incorporated into the gel). Desirably sufficient crosslinking agent(s) is used such that the gel content is determined/measured as in U.S. Pat. Nos. 4,130,534 and 4,311,628 which are hereby incorporated by reference to be at least 50 weight percent, more desirably at least 75 weight percent, and preferably at least 85 weight percent of the total elastomer.

The crosslinking is generally accomplished at temperatures from about 130° C. to about 250° C. more, desirably from about 150° C. to about 225° C. The higher temperatures are used to melt the semicrystalline polyolefin before dynamic vulcanization (a preferred method of preparing the TPV).

Dynamic vulcanization means vulcanizing a crosslinkable rubber under high shear in a blend of semicrystalline polyolefin (thermoplastic olefin (TPO)) and a crosslinkable rubber. As a result, the rubber is simultaneously crosslinked and dispersed as fine particles of a "micro-gel" within the polyolefin matrix. The source of high shear includes roll mills, Banbury mixers, continuous mixers, kneaders or mixing extruders, e.g. twin screw extruders. A unique characteristic of these compositions, notwithstanding the fact that the rubber portion is crosslinked, is that the compositions can be processed and reprocessed by conventional rubber and/or thermoplastic processing techniques and equipment such as extrusion, injection molding, compressing molding, etc. Scrap or flashing can be salvaged and reprocessed by remelting the semicrystalline phase.

These thermoplastic vulcanizates are useful to form molded, extruded, or shaped articles. The articles are useful as vehicle (e.g. automobile) parts such as seals, tubing, hoses, covers, rack and pinion boots, spoilers, bumpers, and diaphragms; for non-vehicle applications in similar products; and as cable outer-coatings.

EXAMPLE 1

Table I shows blends of polypropylene with natural rubber and blends of polypropylene and natural rubber in combination with copolymers of isobutylene. Composition 1 of natural rubber alone was not crosslinked while composition 2 was crosslinked. Composition 3–6 show blends comprising natural rubber and either butyl, chlorobutyl, bromobutyl, or a brominated copolymer of isobutylene with para-methylstyrene. The natural rubber is SMR-5CV. The butyl rubber is Butyl 301. Both Butyl 301 and bromobutyl are available from Bayer. The chlorobutyl and XP-50 are available from Exxon Chemical. XP-50 is a brominated copolymer of isobutylene and para-methylstyrene which is brominated. It generally has from 5 to 10 weight percent p-methylstyrene and from 0.8 to 2 weight percent bromine with the remainder being mostly isobutylene. The Mooney ML (1+8) viscosity of this sample at 125° C. was in the range from 30 to 60. The polypropylene is a fractional melt flow polypropylene available from Lyondell. SP-1045 is a phenolic vulcanizing agent (dimethylol phenol) sold by Schenectady Chemicals used for crosslinking and is the first added crosslinking agent. ZnO and ZnSt if present were added after the phenolic resin. The MgO, if present, was added last after vulcanization. The components were blended at 180° C. and 85 rpm in a Brabender. Three minutes after the plastic melted the crosslinking agents were added and vulcanization was allowed to occur. Mixing was continued for three additional minutes after maximum torque was reached. The composition was then removed from the mixer, cooled, and compression molded at about 20° C. above melting point of the semicrystalline plastic. UTS is ultimate tensile strength, M100 is the strength at 100 percent elongation, UE is ultimate elongation. Shore D is the hardness measured with a Shore D durometer.

TABLE I

| COMP. # | 1 | 2 | 3 | 4 | 5 | 6 |
|---|---|---|---|---|---|---|
| TRIBLEND DVA'S | | | | | | |
| Natural Rubber | 100 g | 100 | 50 | 50 | 50 | 50 |
| Butyl Rubber | — | — | 50 | — | — | — |
| Chlorobutyl | — | — | — | 50 | — | — |
| Bromobutyl | — | — | — | — | 50 | — |
| XP-50 | — | — | — | — | — | 50 |
| Polypropylene | 67 | 67 | 67 | 67 | 67 | 67 |
| ZnO | — | 2 | 2 | 2 | 2 | 2 |
| ZnSt | — | 1 | — | 1 | 1 | 1 |
| SP 1045 | — | 10 | 10 | 10 | 10 | 10 |
| SnCl2 | — | — | 1 | — | — | — |
| MgO | — | — | — | 2 | 2 | 2 |
| PROPERTIES | | | | | | |
| UTS, MPa | 4.83 | 14.76 | 13.24 | 12.90 | 11.79 | 14.41 |
| (Psi) | (700) | (2140) | (1920) | (1870) | (1710) | (2090) |
| M100, MPa | 3.86 | 8.28 | 9.03 | 7.66 | 7.03 | 8.62 |
| (Psi) | (560) | (1200) | (1310) | (1110) | (1020) | (1250) |
| U.E., % | 250 | 270 | 220 | 300 | 300 | 350 |
| Shore D | — | 32 | 37 | 34 | 34 | 37 |
| PROPERTIES AFTER 2 WK 100 C. HOT AIR AGING | | | | | | |
| UTS, MPa | — | — | 13.10 | 12.21 | 9.10 | 13.17 |
| (Psi) | | | (1900) | (1770) | (1320) | (1910) |
| M100, MPa | — | — | — | 8.21 | 7.38 | 9.10 |
| (Psi) | | | | (1190) | (1070) | (1320) |
| U.E., % | — | — | 210 | 250 | 190 | 270 |
| Shore D | — | 30 | 34 | 36 | 30 | 37 |
| PROPERTIES AFTER 2 WK 125 C. HOT AIR AGING | | | | | | |
| UTS, MPa | — | — | 10.69 | 10.83 | 8.28 | 13.03 |
| (Psi) | | | (1550) | (1570) | (1200) | (1890) |
| U.E., % | — | — | 60 | 90 | 30 | 80 |
| Shore D | — | 44 | 39 | 40 | 40 | 45 |
| PROPERTIES AFTER 2 WK 150 C, HOT AIR AGING | | | | | | |
| UTS, MPa | 2.28 | 2.90 | 4.76 | 9.38 | 2.97 | 13.45 |
| (Psi) | (330) | (420) | (690) | (1360) | (430) | (1950) |

Table I shows that thermoplastic vulcanizates from natural rubber without a copolymer of isobutylene do not retain their ultimate tensile strength nor their ability to undergo elongation after hot aging while with blends of natural rubber and isobutylene do retain these physical properties after hot aging. The blends with chlorobutyl and XP-50 retained more of their ultimate tensile strength on aging. Compositions 1 and 2 show that blends of a rubber that hardens on aging (e.g. natural rubber, EPDM, or polymers from conjugated dienes) in simple 2 component thermoplastic vulcanizates lose UTS and ability to elongate on aging. Adding a copolymer of isobutylene (which usually softens on aging) makes 3 component blends that retain an ability to elongate and UTS.

EXAMPLE 2

This example shows thermoplastic vulcanizates of polypropylene with a nitrile rubber or a copolymer of isobutylene with para-methylstyrene and with mixtures thereof. The polymers were mixed at 180° C., 100 rpm. Two minutes after the thermoplastic melted the crosslinking agent resin was added. One minute later the ZnO and ZnSt were added. Three minutes after the crosslinking rate peaked the MgO was added. Two minutes later the sample was removed from the mixer, remixed one minute and molded at 400° F. (204° C.). A compatibilizer for the nitrile rubber is believed to be formed during the mixing. Specifically the nitrile rubber reacts with the XP-50 in the presence of ZnO to form a block copolymer compatibilizer as discussed previously. If rubbers without halogenated para-methylstyrene were used in the blend another in situ formed compatibilizer or a preformed compatibilizer would be recommended.

TABLE II

| | TRIBLEND DVA's | | | | | |
|---|---|---|---|---|---|---|
| COMP # | 7 | 8 | 9 | 10 | 11 | 12 |
| Nitrile Rubber | 100 g* | 80 | 60 | 40 | 20 | 0 |
| XP-50 | 0 | 20 | 40 | 60 | 80 | 100 |
| Polypropylene | 67 | 67 | 67 | 67 | 67 | 67 |
| ZnO | 2 | 2 | 2 | 2 | 2 | 2 |
| ZnSt | 2 | 2 | 2 | 2 | 2 | 2 |
| SP-1045 RESIN | 8 | 8 | 8 | 8 | 8 | 8 |
| SnCl2 | 1 | — | — | — | — | — |
| MgO | 2 | 2 | 2 | 2 | 2 | 2 |
| | | | PROPERTIES | | | |
| Shore D Durometer | 44 | 44 | 42 | 43 | 42 | 41 |
| Tension Set, % | 36 | 40 | 35 | 32 | 30 | 25 |
| UTS, MPa | 14.07 | 14.28 | 15.93 | 14.90 | 16.00 | 14.90 |
| (Psi) | (2040) | (2070) | (2310) | (2160) | (2320) | (2160) |
| M100, Mpa | 9.52 | 8.90 | 9.03 | 11.72 | 10.00 | 9.31 |
| (Psi) | (1380) | (1290) | (1310) | (1700) | (1450) | (1350) |
| U.E., % | 350 | 380 | 360 | 200 | 310 | 270 |
| | PROPERTIES AFTER 2 WK 125 C. HOT AIR AGING | | | | | |
| UTS, MPa | 14.41 | 17.03 | 14.97 | 14.21 | 13.31 | 13.86 |
| (Psi) | (2090) | (2470) | (2170) | (2060) | (1930) | (2010) |
| U.E., % | 10 | 20 | 30 | 90 | 180 | 180 |
| Shore D | 57 | 56 | 53 | 52 | 49 | 41 |

*A compatibilizer was used comprising 10 g of a melt blended amine terminated nitrile-rubber and a maleic anhydride modified polypropylene.

Table II shows that thermoplastic vulcanizates containing nitrile rubber do not retain the capacity to elongate significantly after aging unless a copolymer of isobutylene is present in the alloy.

EXAMPLE 3

Table III shows thermoplastic vulcanizates of polypropylene with either a copolymer of isobutylene or blends of a copolymer of isobutylene with natural rubber. Mixing procedures were similar to Example 1. Compounds with from 20 to 60 weight percent natural rubber retained a significant portion of their ultimate tensile strength (UTS) after aging 2 weeks in hot air.

TABLE III

| | TRIBLEND DVA's | | | | |
|---|---|---|---|---|---|
| COMP. # | 13 | 14 | 15 | 16 | 17 |
| Natural Rubber | 80 g | 60 | 40 | 20 | — |
| Butyl Rubber 301 | 20 | 40 | 60 | 80 | 100 |
| Polypropylene | 67 | 67 | 67 | 67 | 67 |
| ZnO | 2 | 2 | 2 | 2 | 2 |
| ZnSt | 1 | 1 | 1 | 1 | 1 |
| SP 1045 | 10 | 10 | 10 | 10 | 10 |
| SnCl2 | 1 | 1 | 1 | 1 | 1 |
| MgO | — | — | — | — | — |
| | | PHYSICAL PROPERTIES | | | |
| Shore D | 32 | 33 | 33 | 35 | 37 |
| Tension Set % | 25 | 29 | 40 | 41 | 26 |
| UTS, MPa | 11.38 | 11.03 | 9.93 | 11.10 | 17.72 |
| (Psi) | (1650) | (1600) | (1440) | (1610) | (2570) |
| U.E., % | 260 | 300 | 300 | 270 | 390 |
| | PROPERTIES AFTER 2 WK 125 C. HOT AIR AGING | | | | |
| UTS, MPa | 1.17 | 9.45 | 7.17 | 6.55 | 15.93 |
| (Psi) | (170) | (1370) | (1040) | (950) | (2310) |
| U.E., % | 0 | 10 | 50 | 130 | 390 |
| Shore D | 43 | 43 | 40 | 35 | 36 |

EXAMPLE 4

This example shows control thermoplastic vulcanizates of polypropylene with ethylene/propylene rubber (Comp #20) and polypropylene with copolymers of isobutylene and para-methylstyrene XP-50 (Comp 21). It shows blends of polypropylene with two rubbers, ethylene/propylene diene and copolymers of isobutylene and para-methylstyrene (XP50) (Comps 18 and 19). Comps 18 and 19 with blends of two rubbers better retained their ultimate tensile strength (UTS) and ultimate elongation (LIE) then did Comp 20 with a single rubber ethylene/propylene rubber.

TABLE IV

| | TRIBLEND DVA's | | | |
|---|---|---|---|---|
| COMP. # | 18 | 19 | 20 | 21 |
| EPDM | 60 g | 40 | 100 | — |
| BrIIR, XP50 | 40 | 60 | — | 100 |
| SnCl2 | — | — | 1 | — |
| PP | 67 | 67 | 67 | 67 |
| ZnO | 2 | 2 | 2 | 2 |
| ZnSt | 1 | 1 | 1 | 1 |
| Phenolic Resin | 7.5 | 7.5 | 7.5 | 7.5 |
| MgO, Mag D | 1 | 1 | 1 | 0 |
| | PHYSICAL PROPERTIES | | | |
| UTS, Mpa | 21.52 | 19.79 | 20.83 | 19.59 |
| (Psi) | (3120) | (2870) | (3020) | (2840) |
| M100, Mpa | 9.45 | 10.00 | 8.41 | 10.28 |
| (Psi) | (1370) | (1450) | (1220) | (1490) |
| U.E., % | 350 | 320 | 380 | 280 |
| Shore D | 38 | 39 | 37 | 40 |
| | PROPERTIES AFTER 2 WK 150 C. HOT AIR AGING | | | |
| UTS, MPa | 21.45 | 21.79 | 16.21 | 18.41 |
| (Psi) | (3110) | (3160) | (2350) | (2670) |
| M100, MPa | 10.21 | 10.69 | 9.24 | 11.31 |
| (Psi) | (1480) | (1550) | (1340) | (1640) |

TABLE IV-continued

| | TRIBLEND DVA's | | | |
|---|---|---|---|---|
| COMP. # | 18 | 19 | 20 | 21 |
| U.E., % | 300 | 280 | 270 | 230 |
| Shore D | 39 | 40 | 39 | 41 |
| PROPERTIES AFTER 4 WK 150 C. HOT AIR AGING | | | | |
| UTS, MPa | 16.48 | 18.90 | 13.52 | 17.52 |
| (Psi) | (2390) | (2740) | (1960) | (2540) |
| M100, MPa | 10.48 | 10.90 | 9.24 | 11.93 |
| (Psi) | (1520) | (1580) | (1340) | (1730) |
| U.E., % | 230 | 250 | 220 | 210 |
| Shore D | 40 | 40 | 39 | 43 |
| PROPERTIES AFTER 8 WK 150 C. HOT AIR AGING | | | | |
| UTS, MPa | 11.66 | 13.03 | 7.52 | 14.00 |
| (Psi) | (1690) | (1890) | (1090) | (2030) |
| M100, MPa | 10.41 | 10.90 | — | 11.93 |
| (Psi) | (1510) | (1580) | | (1730) |
| U.E., % | 130 | 150 | 70 | 140 |
| Shore D | 39 | 39 | 36 | 40 |

While in accordance with the patent statutes the best mode and preferred embodiment has been set forth, the scope of the invention is not limited thereto, but rather by the scope of the attached claims.

What is claimed is:

1. A thermoplastic vulcanizate, comprising;
   (a) from about 10 to about 90 parts by weight of a semicrystalline polyolefin having from 2 to 14 carbon atoms per repeat unit
   (b) from about 10 to about 90 parts by weight of a blend of at least two rubbers comprising
      (1) from about 30 to about 90 weight percent of a rubber copolymer of isobutylene and para-alkylstyrene; said copolymer optionally being halogenated, and
      (2) from about 10 to about 70 weight percent of an ethylene/propylene diene rubber, natural rubber or a polymer polymerized predominantly from one of more conjugated diene monomers having from 4 to 10 carbon atoms or combinations thereof,
   wherein said weight percents are based on said blend of at least two rubbers and the parts by weight are based on 100 parts by weight of the total amount of said polyolefin and said rubbers, and
   wherein said thermoplastic vulcanizate is dynamically vulcanized so that at least 85 mole percent of said rubbers have one or more crosslinks.

2. A thermoplastic vulcanizate according to claim 1, wherein said thermoplastic vulcanizate further comprises one or more fillers wherein at least 60 weight percent of said fillers present are in said at least two rubbers.

3. A thermoplastic vulcanizate according to claim 2, wherein said at least two rubbers comprise 1) a rubber copolymer of isobutylene and para-alkylstyrene and 2) said natural rubber or a polymer polymerized predominantly from one or more conjugated dienes.

4. A thermoplastic vulcanizate according to claim 3, wherein said semicrystalline polyolefin is predominantly derived from monomers having the formula $CH_2=CHR$ where R is hydrogen or an alkyl of from 1 to 12 carbon atoms.

5. A thermoplastic vulcanizate according to claim 4, wherein said semicrystalline polyolefin is polypropylene, polyethylene, or a polybutene or mixtures thereof.

6. A thermoplastic vulcanizate according to claim 3, wherein said copolymer of isobutylene and para-alkylstyrene is a halogenated copolymer.

7. A thermoplastic vulcanizate according to claim 5, wherein said natural rubber or polymer polymerized predominantly from one or more conjugated dienes comprise polybutadiene, a butadiene-acrylonitrile copolymer, or styrene-butadiene rubber or combinations thereof.

8. A thermoplastic vulcanizate according to claim 1, wherein said semicrystalline polyolefin is from about 25 to about 75 parts by weight and said at least two partially crosslinked rubbers are from about 25 to about 75 parts by weight.

9. A thermoplastic vulcanizate according to claim 8, wherein said copolymer polymerized predominantly from isobutylene is a halogenated copolymer of at least isobutylene and para-methylstyrene.

10. A thermoplastic vulcanizate according to claim 1, wherein said at least two rubbers comprise said copolymer of isobutylene and para-alkylstyrene and ethylene/propylene diene rubber.

11. A thermoplastic vulcanizate according to claim 10, wherein said semicrystalline polyolefin is from about 25 to about 75 parts by weight and said at least two partially crosslinked rubbers are from about 25 to about 75 parts by weight.

12. A thermoplastic vulcanizate according to claim 10, wherein said copolymer polymerized predominantly from isobutylene is a halogenated copolymer of at least isobutylene and para-methylstyrene.

13. A process for forming a thermoplastic vulcanizate comprising:

blending from about 10 to about 90 parts by weight of a semicrystalline polyolefin having from 2 to 14 carbon atoms per repeat unit with from about 10 to about 90 parts by weight of at least two rubbers wherein said at least two rubbers comprise 1) from about 30 to about 90 weight percent of a rubber copolymer of isobutylene and para-alkylstyrene and 2) from about 10 to about 70 weight percent of an EPDM rubber, natural rubber, a polymer polymerized predominantly from one or more conjugated diene monomers or combinations thereof, and subsequently dynamically vulcanizing said at least two rubbers so that at least 85 mole percent of said rubbers have one or more crosslinks.

* * * * *